United States Patent [19]

Rasulev et al.

[11] Patent Number: 4,891,486
[45] Date of Patent: Jan. 2, 1990

[54] DEVICE FOR FEED CONTROL OF ELECTRODE-TOOL IN SPARK EROSION MACHINES

[76] Inventors: Vadim A. Rasulev, USSR, Tashkent, massiv Kara-Su-1, 22, kv. 15, Tashkent, U.S.S.R.; Vladimir I. Khainov, USSR, Tashkent, ulitsa Levanevsko-go, 41, kv. 4, Tashkent, U.S.S.R.; Erkin T. Abdukarimov, USSR, Tashkent, TS-1, 52, kv.6, Tashkent, U.S.S.R.

[21] Appl. No.: 236,529
[22] PCT Filed: Sep. 17, 1987
[86] PCT No.: PCT/SU87/00100
§ 371 Date: May 24, 1988
§ 102(e) Date: May 24, 1988
[87] PCT Pub. No.: WO88/02293
PCT Pub. Date: Apr. 7, 1988

[30] Foreign Application Priority Data

Sep. 25, 1986 [SU] U.S.S.R. .............................. 4119672

[51] Int. Cl.⁴ ............................................ B23H 7/18
[52] U.S. Cl. .................... 219/69.16; 204/129.5
[58] Field of Search .................. 219/69 G, 69.16; 204/129.25, 129.5, 225

[56] References Cited

FOREIGN PATENT DOCUMENTS

| 464433 | 9/1979 | U.S.S.R. | 219/69 G |
| 859095 | 8/1981 | U.S.S.R. | 219/69 G |
| 876349 | 10/1981 | U.S.S.R. | 219/69 G |
| 952503 | 8/1982 | U.S.S.R. | |
| 986697 | 1/1983 | U.S.S.R. | 219/69 G |
| 1202767 | 1/1986 | U.S.S.R. | |

OTHER PUBLICATIONS

E. V. Armensky, G. B. Falk, "Elektricheskie Mikromashiny", third edition, 1985.
Ju. Kh. Lukes, "Skhemy na Poluprovodnikovykh Diodakh", 1972, Energia Publ., Moscow, see pp. 170–171, FIGS. 6.29–6.34.
B. G. Gutkin, "Avtomatizatsia Elektroerozionnykh Stankov", 1971.
B. A. Artamonov et al., "Elektrofizicheskie Elektrokhimicheskie Metody Obrabotki Materialov", 1983.

Primary Examiner—A. D. Pellinen
Assistant Examiner—Geoffrey S. Evans
Attorney, Agent, or Firm—Lilling & Greenspan

[57] ABSTRACT

A device for electrode-tool feed control in electroerosion machines includes a power source (1) equipped with reservoir capacitors, one output of the power source (1) is connected to a workpiece (2) and the other to the electrode-tool (3), a threshold circuit (4), and one of the inputs of a switching device (5). The output of the threshold circuit (4) is connected to an electronic switch (6) and to the second input of the switching device (5) whose output is connected to an amplifier (7). The output of the amplifier (7) is connected to a diode bridge (8) of a converter unit (9), connected in series with a primary winding (10) of a transformer (11) of this converter unit (9) and to an AC supply line (12). The output of the electronic switch (6) is connected to the other diode bridge (13) of the converter unit (9) and to a second primary winding (14) of the transformer (11) of this converter unit (9). The secondary winding (15) of the transformer (11) is connected to a winding (16) of a controlled reversible AC motor (17) whose other winding (18) is connected to the AC supply line (12).

1 Claim, 2 Drawing Sheets

DEVICE FOR FEED CONTROL OF ELECTRODE-TOOL IN SPARK EROSION MACHINES

FIELD OF THE INVENTION

1. Background of the Invention

This invention relates to electric discharge machining of electrically conducting materials and, in particular, to devices for feed control of electrode-tools in electro-erosion machines.

2. Description of the Prior Art

The basic problem in controlling the feed of tool during electro-erosion machining is to control the feed rate so that it corresponds to the rate of erosion in the gap between the tool and workpiece. It is also important to achieve high quality electric discharge machining in terms of the surface finish, precise shape of the hole, etc. The process of electro-erosion machining is subject to many accidental disturbances due to the presence of electrically conducting particles in the spark gap and instability of the power supply voltage. It is, therefore, advisable that the desired operating conditions and the desired feed rate of the electrode-tool are maintained by a device for feed control of the electrode-tool in electro-erosion machines.

Known in the art is a tool feed control device for spark erosion machines (SU,A, No. 1202767), comprising a pulse generator having its input connected to one of the outputs of a timer, and a servo drive. The device also comprises, connected in series, a resistance transducer, an electronic switch controlled by the timer, a reservoir capacitor, and an amplification and comparison device having its output connected to the servo drive and its input connected to a standard voltage source.

This device can be used to measure the resistance of the spark gap in the intervals between current pulses supplied from the pulse generator.

But this device is deficient in that it cannot take into account the resistance of the electrode-tool during the spark erosion process. When deep and super-deep holes are made with a small diameter, the electrode-tool wears out quickly and its resistance changes very fast. This may be the cause of many serious errors.

Some aspects of this problem are dealt with in the known device for feed control of an electrode-tool (B. A. Artamonov et al., Elektricheskie i elektrokhimicheskie metody obrabotki materialov, Vysshaya shkola Publ., 1983, vol. 1, p. 53, FIG. 1.41), which comprises, connected in series, a measuring transducer, a comparison unit, and an amplifier having its output connected to an actuating device for shifting the electrode-tool, while a power source is connected to the spark gap, a signal therefrom being fed to the measuring transducer.

Here the control parameter, that is the signal carrying information on the size of the spark gap and picked up from the operational circuit of the power supply, may be instantaneous or mean voltages across the electrodes in the spark gap, or the mean strength of current in the electrode circuit, or the sparkgap breakdown delay time, etc. In this case the tool characteristics, e.g. its material or electric resistance, have no effect on the accuracy and stability of the metal working process. When the mean erosion voltage is measured in the spark gap, it can be used to assess the size of the spark gap, given the current of the power source. Information is continuously fed to the comparison unit and, further on, via the amplifier, in accordance with the sign, to an actuator, e.g. control winding of a bidirectional electric motor.

However, this device is deficient in that it cannot be used to produce deep and super-deep small-diameter high-quality holes. When the signal from the spark gap and the reference signal are equal, no instructions are produced by the comparison unit to the actuator. The electrode-tool stops. Zero feed of the tool or its slow retraction followed by forward feed result in longer erosion voltage effect in some portions of the workpiece surface. This negatively affects the quality of the surface due to lateral erosion and holes become barrel-shaped or oval. Faster tool feed rate also results in more frequent stops of the electrode-tool and, consequently, in deterioration of the treatment quality. When deep holes are pierced, erosion products have no time to leave the treatment zone and produce a current-conducting medium which seriously affects the treatment quality and reduce the piercing rate.

DISCLOSURE OF THE INVENTION

It is an object of this invention to provide a device for feed control of an electrode-tool, which can ensure smooth feed of the electrode-tool and its swift retraction when the spark gap voltage drops to a pre-set level.

This object is achieved by a device for feed control of an electrode-tool in electric discharge machines, which comprises a power source featuring reservoir capacitor, a switching device having its input connected to an output of the power source equipped with reservoir capacitors, an amplifier whose input is connected to an output of the switching device, and a controlled reversible AC motor. According to the invention, a threshold circuit is provided with an electronic switch and a converter unit comprising a transformer with two primary windings connected in series to a supply AC line via diode bridges, one of said diode bridges being connected to the electronic switch, while the other is connected via the amplifier to the switching device, the electronic switch is connected to an output of the threshold circuit and to one of the inputs of the switching device, the other input of the switching device being connected to the input of the threshold circuit connected to the reservoir capacitors of the power source and to the electrode-tool. One of the windings of the electrode-tool feed motor is connected to the secondary winding of the transformer of the converter unit, while the other winding thereof.

This circuit arrangement of the device for tool feed control in electro-erosion machines ensures uninterrupted feed of the electrode-tool and fast retraction of the electrode-tool when the spark gap voltage drops to a predetermined level.

BRIEF DESCRIPTION OF ACCOMPANYING DRAWINGS

The invention will now be described in greater detail with reference to specific embodiments thereof and accompanying drawings wherein.

BEST MODE FOR CARRYING OUT THE INVENTION

Figure 1:
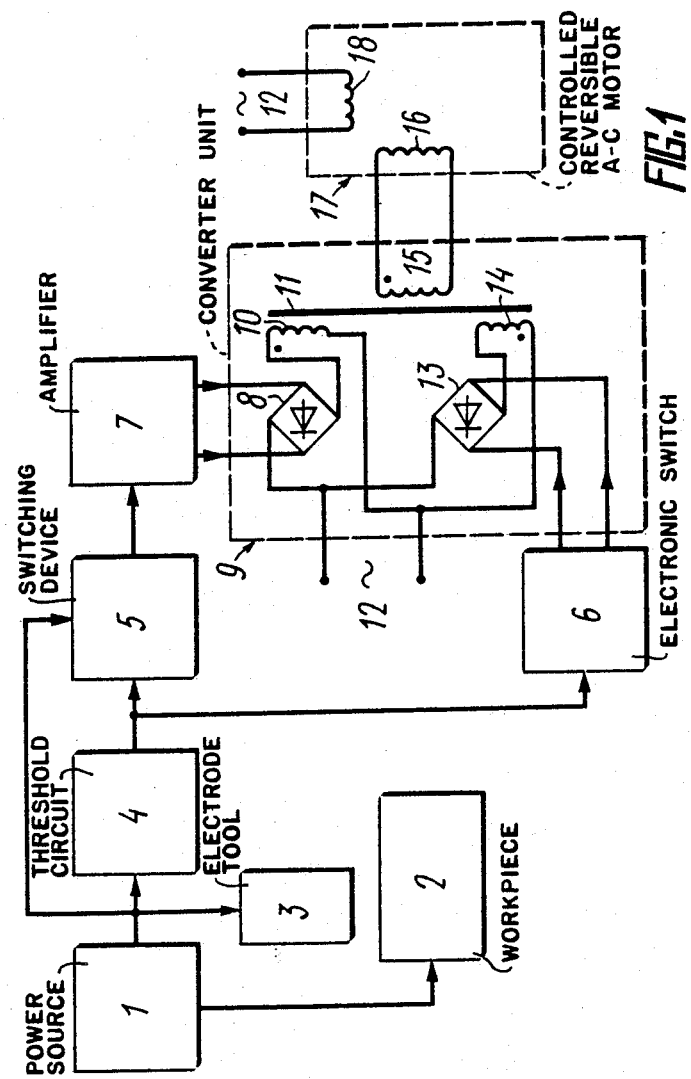
FIG. 1 illustrates a schematic block diagram of a device for electrode-tool feed control in electro-erosion machines, according to the invention.

A device for electrode-tool feed control, according to the invention, comprises a power source 1 (FIG. 1) having reservoir capacitors. One output of the power source 1 is connected to a workpiece 2 and the other output thereof is connected to an electrode-tool 3, a threshold circuit 4 and to one of the inputs of a switching device 5. An output of the threshold circuit 4 is connected to an electronic switch 6 and to a second input of the switching device 5 whose output is connected to an amplifier 7. An output of the amplifier 7 is connected to a diode bridge 8 of a converter unit 9, which is coupled in series with a primary winding 10 of a transformer 11 of the converter unit 9 and with an AC supply line 12. The output of the electronic switch 6 is connected to another diode bridge 13 of the converter unit 9 and another primary winding 14 of the transformer 11 of the converter unit 9. The secondary winding 15 of the transformer 11 is connected to one of the windings 16 of a controlled reversible AC motor 17 whose other winding 18 is connected to the AC supply line 12.

The device for electrode-tool feed control according to the invention operates as follows.

The voltage from the power source 1 featuring reservoir capacitors is supplied to the electrode-tool 3 and the workpiece 2. The working voltage between the electrode-tool 3 and the workpiece 2 is the function of electro-erosion current and the width of the spark gap. This voltage is fed to the input of the threshold circuit 4 and the switching device 5. When this voltage is lower than the threshold level of the circuit 4, the signal of this threshold circuit 4 makes the switching device 5 non-conductive and no voltage is supplied via the other input of the switching device 5 to the amplifier 7. This de-energizes the winding 10 of the transformer 11 of the converter unit 9, which is connected in series with the diode bridge 8 and the AC supply line 12. Simultaneously, the output signal of the threshold circuit 4 opens the diode bridge 13 of the converter unit 9, which is connected in series with the winding 14 of the transformer 11 of the converter unit 9 and the AC supply line 12. The voltage from the secondary winding 15 of the transformer 11 of the converter unit 9 is supplied to one of the windings 16 of the controlled reversible AC motor 17. The electrode-tool 3 is quickly retracted from the workpiece 2. The other winding 16 of the motor 17 is connected to the AC supply line 12.

When the working voltage of the spark gap exceeds the preset level of the threshold circuit 4, the output signal of this threshold circuit 4 makes the electronic switch 6 non-conductive and this closes the diode bridge 13 of the converter unit 9, thus deenergizing the primary winding 14 of the transformer 11 of the converter unit 9. Simultaneously, the switching device 5 is activated to supply voltage from the spark gap via another input of the switching device 5 to the amplifier 7 which opens the diode bridge 8 of the converter unit 9 supplying the primary winding 10 of the transformer 11. The voltage across this winding 10 and, consequently, across the secondary winding 15 of the transformer 11 is proportional to the output signal of the amplifier 7, which is the function of the working voltage in the spark gap. The electrode-tool 3 starts moving forward, that is fed towards the workpiece 2.

The primary windings 10 and 14 of the transformer 11 of the converter unit 9 are coupled in phase opposition. This permits changing the phase of the voltage taken from the secondary wnding 15 of the transformer 11 in accordance with the spark gap working voltage. In this manner, the electrode-tool 3 is either forward fed or quickly retracted from the workpiece 2.

One of the possible embodiments of the device for tool feed control operates as follows.

Figure 2:
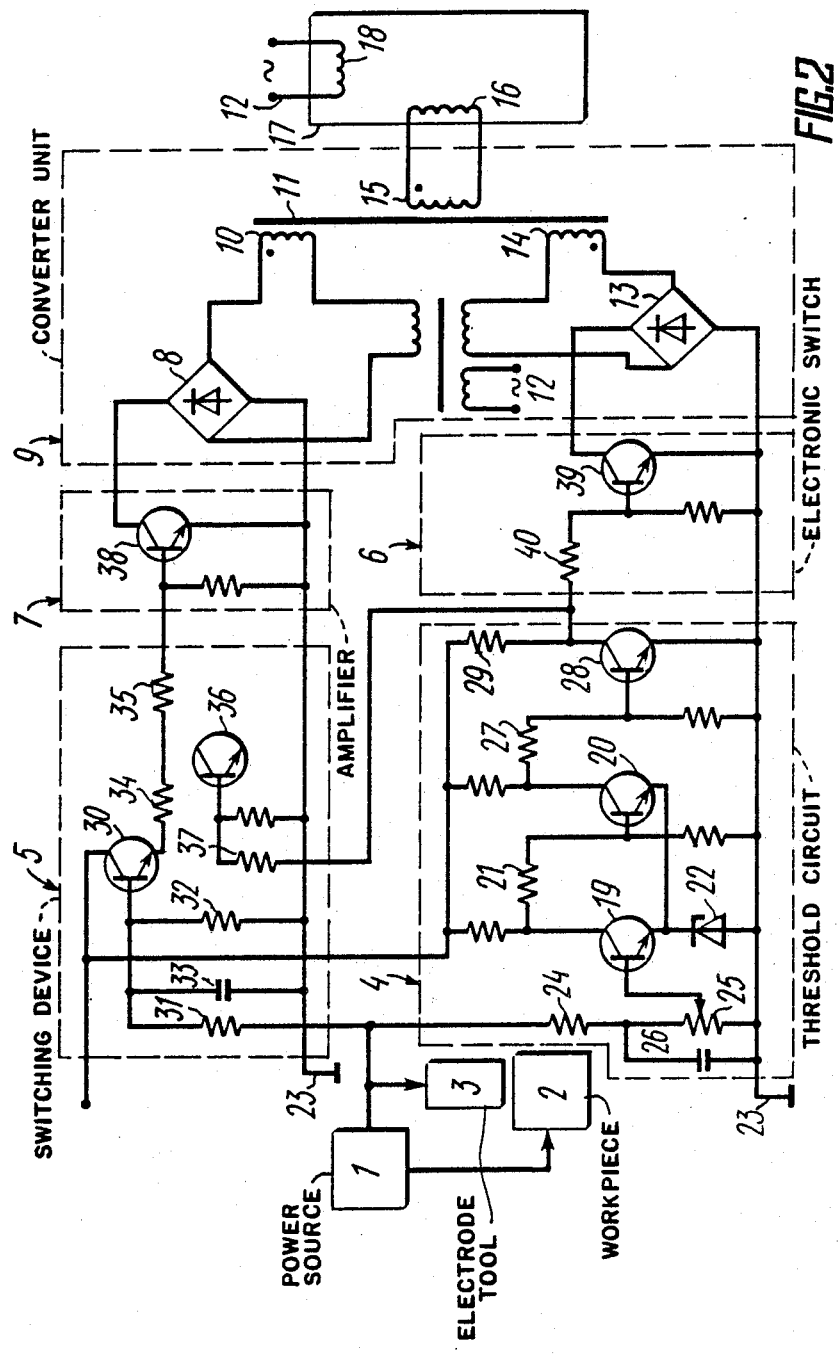
FIG. 2 illustrates an embodiment of this device, according to the invention.

The threshold circuit 4 (FIG. 2) uses a known Schmitt trigger circuit and comprises two transistors 19 and 20. The collector of the transistor 19 is connected via a resistor 21 to the base of the transistor 20. Emitters of the transistors 19 and 20 are joined together and coupled to a reference diode 22 connected, in turn, to a common supply line 23. A voltage divider composed of two resistors 24 and 25 is inserted at the input of the threshold circuit. The resistor 25 is variable and by-passed via a capacitor 26. A controlled lead of the resistor 25 is connected to the base of the transistor 19 to function as a regulator of the threshold level of the threshold circuit 4. The collector of the transistor 20 is connected, via a resistor 27, to the base of a transistor 28 whose emitter is connected to the supply line 23 and whose collector is connected to a resistor 29. The output of the threshold circuit 4 is connected to the electronic switch 6 and to the switching device 5.

The switching device 5 is equipped with a transistor 30 whose base is connected, via a resistor 31, to the spark gap and, via a resistor 32 bypassed by a capacitor 33, to the common supply line 23. The emitter of the transistor 30 is connected, via a resistor 34, to a resistor 35 and to the collector of a transistor 36. The emitter of the transistor 36 is connected to the common supply line 23. The base of the transistor 36 is connected, via a resistor 37, to the output of the threshold circuit 4, which is the collector of the transistor 28. The resistor 35 is connected to the input of the amplifier 7.

The amplifier 7 is equipped with a transistor 38. The emitter of the transistor 38 is connected to the common supply line 23, its collector is connected to the positive lead of the diode bridge 8. The negative lead of the diode bridge 8 is connecfed to the common supply line 23.

The electronic switch 6 comprises a transistor 39 and a resistor 40 which connects the base of the transistor 39 with the output of the threshold circuit 4, which is the collector of the transistor 28. The emitter of the transistor 39 is connected to the common supply line 23, while the collector thereof is connected to the positive lead of the diode bridge 13. The negative lead of the diode bridge 13 is connected to the common supply line 23. The motor 17 is the drive motor for feeding the electrode-tol 3. The control winding 16 of this motor 17 is connected to the secondary winding 15 of the transformer 11 of the converter unit 9, while the excitation winding 18 thereof is connected to the AC supply line 12.

When the device is operating, supply voltage from the source 1 is fed to the electrode-tool 3 and, simultaneously, via the resistor 31 to the switching device 5 and, via the resistors 24 and 25, to the threshold circuit 4. This voltage is integrated on the capacitor 26 in the threshold circuit 4. The output voltage at the controlled lead of the threshold setting resistor 25 of the circuit 4 is further supplied to the Schmitt trigger circuit built around transistors 19 and 20. The reference component here is the reference diode 22. The voltage taken from the output of the Schmitt trigger (collector of the transistor 20) is supplied via the limiting resistor 27 to the amplify-the resistor 29. The transistor 28 may be conducting or non-conducting in accordance with the voltage applied thereto. If the signal applied to the input of the threshold circuit 4 is higher than the preset level adjusted by the controlled lead of the threshold setting resistor 25 of the threshold circuit 4, the transistor 19 is conductive, the transistor 20 is non-conductive, the transistor 28 is conductive and the voltage is taken from the collector of the transistor 28 via the resistor 37 to the transistor 36 of the switching device 5. The transistor 36 is non-conductive and the signal fed from the spark gap and from the integrating circuit 31, 33, 32 of the switching device 5 is supplied to the transistor 30 functioning as an emitter follower and, via the resistors 34 and 35, to the transistor 38 of the amplifier 7. The transistor 38 functions as a linear amplifier and controls the operation of the diode bridge 8 of the converter unit 9, which supplies power to the primary winding 10 of the transformer 11 of the converter unit 9. In this case, the motor 17 ensures that the electrode-tool 3 is fed forward towards the workpiece 2 in order to set the spark gap adequate for spark erosion process.

Simultaneously, collector voltage of the transistor 28 is supplied, via the resistor 40, to the base of the transistor 39 of the electronic switch 6. The transistor 39 is rendered non-conductive and closes the diode bridge 13 of the converter unit 9, deenergizes the winding 14 of the transformer 11 of the unit 9.

In case the signal fed to the threshold circuit 4 from the spark gap is lower than the threshold level dictated by the controlled lead of the resistor 25, the transistor 19 is non-conductive, the transistor 20 is conductive, the transistor 28 is non-conductive and its collector voltage is supplied, via the resistor 37, to the transistor 36 of the switching device 5. The transistor 36 is conductive and the signal fed from the spark gap and from the integrating circuit 31, 33, 32 of the switching device 5 to the transistor 30 cannot reach the input of the amplifier 7 since the transistor 36 is a bypass for the output circuit (transistors 34, 35) of the transistor 30. This makes the diode bridge 8 non-conductive and deenergizes the winding 10 of the transformer 11. The feed of the electrode-tool 3 is discontinued.

Simultaneously, collector voltage of the transistor 28 is supplied, via the resistor 40, to the transistor 39 of the electronic switch 6. The transistor 39 becomes conductive and opens the diode bridge 13 of the converter unit 9 feeding power to the winding 14 of the transformer 11, which is connected in phase opposition with the winding 10 of the same transformer 11. The voltage produced at the secondary winding 15 of the transformer 11 of the converter unit 9 switches the motor 17 to a condition ensuring fast retraction of the electrode-tool 3. This condition is maintained until the voltage fed to the input of the threshold circuit 4 exceeds the threshold level set in the circuit 4. When the input voltage of the threshold circuit 4 becomes higher than the preset level of this circuit 4, the device switches over to the normal tool feed process as described above.

In this manner, the herein proposed device for electrode-tool feed control uses a threshold circuit, a switching device, an electronic switch, an amplifier, and a converter to provide a continuous electrode-tool feed process. In case electric conductivity in the treatment zone increases and the electric spark erosin process deteriorates, the device is switched over to fast tool retraction. Working fluid is permitted an easier access to the treatment zone, erosion products are quickly evacuated from this zone, and normal conditions for spark erosion process are restored. In this manner the process of spark erosion is made stable, particularly when piercing deep and super-deep small-diameter holes having high quality of surface and geometrical dimensions achieved by spark erosion process.

This invention can be widely used in machine-tool building and metal working, in NC machine tools for piercing deep and super-deep holes in electrically conducting materials, which may be of any shape and size.

We claim:

1. A device for electrode-tool feed control in electro-erosion machines, comprising a power source (1) equipped with reservoir capacitors and having one output thereof connected to a workpiece and the other to the electrode-tool, a switching device (5) having its input connected to the output of the power source (1), an amplifier (7) whose input is connected to the output of the switching device (5), and a controlled reversible AC motor (17), an electronic switch (6), and a converter unit (9) including a transformer (11) featuring two primary windings (10, 14) connected in series with an AC supply line (12) via diode bridges (8,13), one of said diode bridges being connected to the electronic switch (6) and the other, via the amplifier (7), to the switching device (5), while the electronic switch (6) is connected to the output of the threshold circuit (4) and one of the inputs of the switching device (5) whose other input is connected to the input of the threshold circuit (4) coupled to the reservoir capacitors of the power source (1) and the electrode-tool (3), and a winding (16) of the reversible AC motor (17) is connected to a secondary winding (15) of the transformer (11) of the converter unit (9) and the other winding thereof is connected to the AC supply line (12).

* * * * *